Patented Oct. 19, 1926.

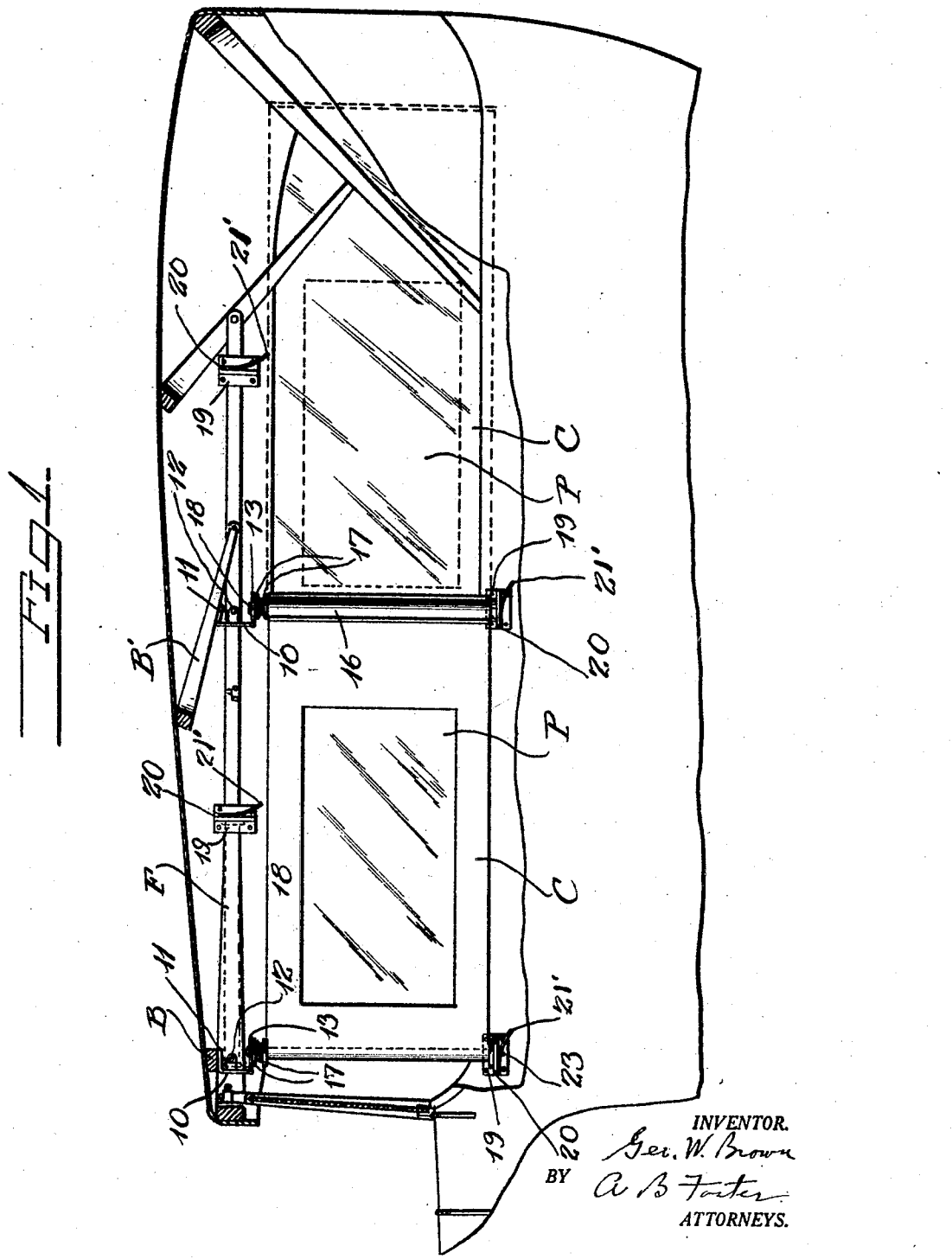

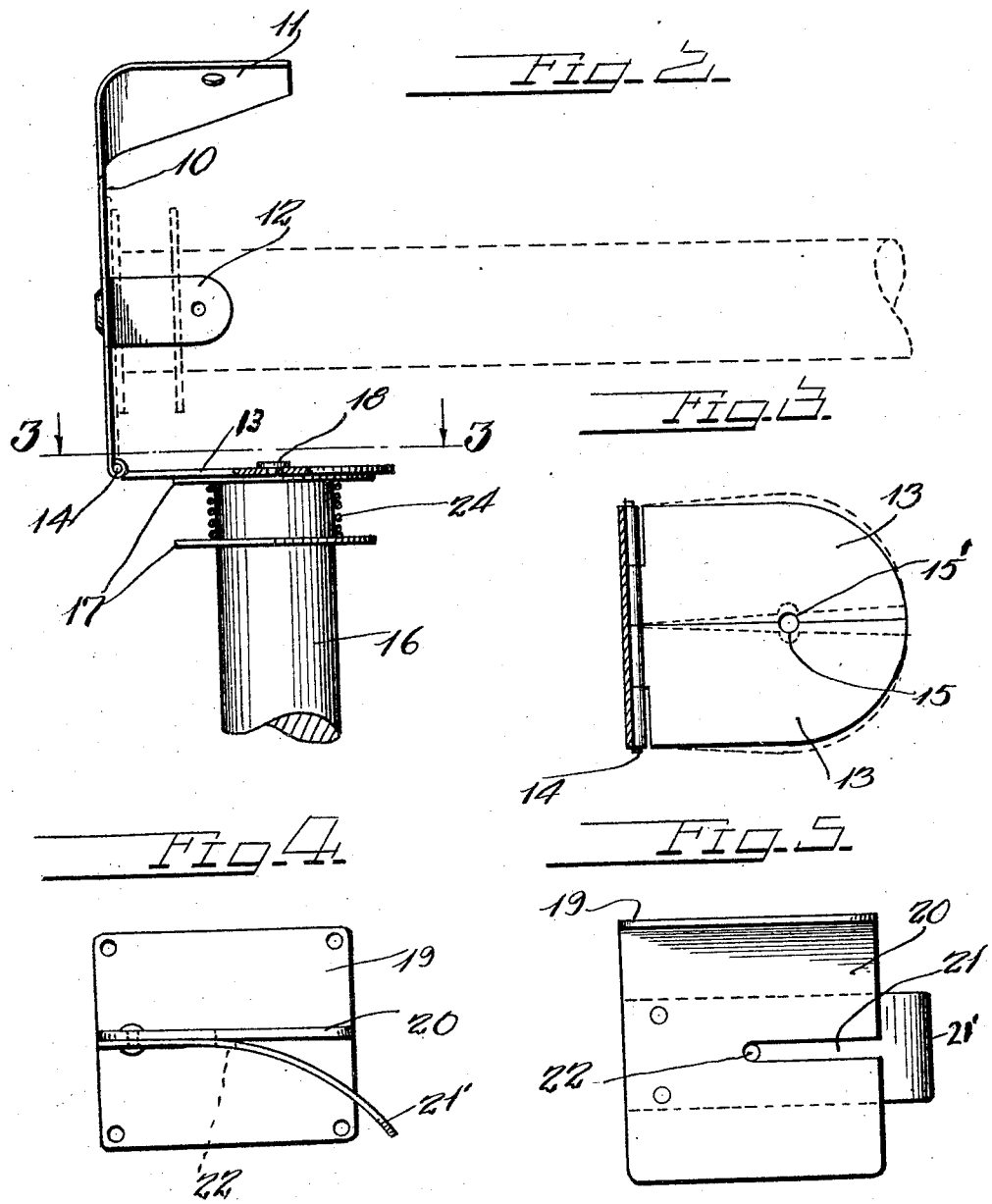

1,603,509

UNITED STATES PATENT OFFICE.

GEORGE W. BROWN, OF SELMA, ALABAMA.

CURTAIN HOLDER FOR AUTOMOBILES.

Application filed November 2, 1925. Serial No. 66,264.

This invention relates to automobiles and has special reference to side curtains for automobiles.

One object of the invention is to improve the general construction of devices of this character.

A second object of the invention is to provide an improved arrangement for housing an automobile side curtain.

A third object of the invention is to provide an improved supporting bracket for a roller on which an automobile curtain is rolled.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a longitudinal section through the upper part of an automobile showing the device in position.

Figure 2 is an enlarged side elevation of the bracket and upper part of the roller on which the curtain is wound.

Figure 3 is a section on the line 3—3 of Figure 2.

Figure 4 is a face view of a second cooperating bracket used therewith.

Figure 5 is a view at right angles to Figure 4.

The invention consists of 3 parts. The first of these parts is the front supporting bracket which is formed from a plate 10 bent at the top as at 11 to enable the same to be connected to the bow B or the brace B' of an automobile. This bracket has the part 10 arranged vertically and may be provided with a lug 12 by which it may be fastened to the side frame member F of the automobile top. At the bottom of the bracket 10 there is hinged a pair of similar plates 13 having their edges normally held together by the resiliency of the hinge pintle 14. Each edge is provided with a semi-circular notch 15. The roller 16 is provided at its top part with spaced flanges 17 and above these spaced flanges the roller has a headed pintle 18. The shank of this pintle is of proper size to fit in the opening formed by the notches 15 yet, it will be seen that by springing the parts 13 away from each other, as shown in dotted lines in Figure 3, this pintle may be withdrawn. The cooperating bracket consists of a plate 19 from the center of which extends a second plate 20 having a slot 21 therein. To one side of this plate 20 is fixed a spring plate 21' having an opening 22 therein as coincides with the inner end of the slot 21.

One of these plates 19 is fixed vertically below each of the brackets 10, there being preferably two of these brackets which are shown in Figure 1. A second plate of similar character is fixed to the side frame member F at the rear of each plate 10. In use a curtain C is rolled on the roller 16, the space between the flanges 17 being used for a rerolling cord if desired. Now as shown in Figure 1 when it is desired to use the curtains the rollers 16 are dropped downwardly until the pintle 23 on the lower ends of said rollers slips into the slots 21 and is engaged in the opening 22. The curtain may then be drawn rearwardly as shown in said figure and fastened by appropriate means.

When the curtains are not desired to be used they can be rolled up on the roller either manually or by pulling on the rerolling cord 24 and by depressing the member 21, the lower end of the roller may be released from its vertical position and the roller swung, by means of the hinged connection between the plates 10 and 13, up to its horizontal position as shown in dotted lines at the left of Figure 1. Thus the curtain will be housed out of sight. If it is desired to remove the curtains entirely it is simply necessary to spring the parts 13 away from each other whereupon the pintle 18 can be withdrawn from the notches 15.

The curtains can of course be provided with transparent panel P if desired, such panels being made of the usual flexible material.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

It will be understood that while I have illustrated a cord 24 to be pulled by hand to roll up the curtain, a spring roller of any approved construction can be substituted for this, one of the pintles, (say the upper one preferably) being square or flat, and the opening to receive the same being correspondingly shaped.

Having thus described the invention, what is claimed as new, is:

1. A curtain roller supporting device for automobiles and including a bracket having vertically arranged portion, a pair of members hingedly connected to the lower edge of said bracket and having proximal edges each provided with a semi-circular notch, said notches cooperating to form a roller pintle receiving opening, a roller having a headed pintle slidable between said members and having a shank adapted to engage in said notches to form a journal when so engaged, and a curtain wound on said roller.

2. A curtain roller supporting device for automobiles and including a bracket having vertically arranged portion, a pair of members hingedly connected to the lower edge of said bracket and having proximal edges each provided with a semi-circular notch, said notches cooperating to form a roller pintle receiving opening, a roller having a headed pintle slidable between said members and having a shank adapted to engage in said notches to form a journal when so engaged, a curtain wound on said roller, said roller having a pintle at its opposite end, and a pair of slotted holding members for said pintle arranged to hold the roller in selective positions at right angles to each other.

In testimony whereof I affix my signature.

GEORGE W. BROWN.